United States Patent
Kim et al.

(10) Patent No.: US 7,826,846 B2
(45) Date of Patent: Nov. 2, 2010

(54) HAND OVER METHOD FOR DUAL BAND/DUAL MODE MOBILE COMMUNICATION TERMINAL

(75) Inventors: Hyun-Wook Kim, Seongnam-si (KR); Young-Lak Kim, Yongin-si (KR); Nam-Gun Kim, Seoul (KR); Jong-Tae Ihm, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 364 days.

(21) Appl. No.: 11/576,515

(22) PCT Filed: Apr. 19, 2005

(86) PCT No.: PCT/KR2005/001118

§ 371 (c)(1),
(2), (4) Date: Feb. 20, 2008

(87) PCT Pub. No.: WO2006/112562

PCT Pub. Date: Oct. 26, 2006

(65) Prior Publication Data

US 2008/0254796 A1    Oct. 16, 2008

(51) Int. Cl.
*H04W 36/00* (2009.01)
(52) U.S. Cl. .......... 455/436; 455/435.1; 455/435.2; 455/439; 455/437; 455/438
(58) Field of Classification Search .......... 455/436, 455/435.1, 435.2, 435.3, 437, 438, 439
See application file for complete search history.

(56) References Cited

U.S. PATENT DOCUMENTS

2003/0224791 A1* 12/2003 Choi et al. ............... 455/436
2005/0037757 A1* 2/2005 Moon et al. .............. 455/436
2006/0234710 A1* 10/2006 Noh ........................... 455/436

FOREIGN PATENT DOCUMENTS

| JP | 2001-186552 | 7/2001 |
| JP | 2001-224052 | 8/2001 |
| KR | 10-2005-0077196 | 8/2005 |

* cited by examiner

*Primary Examiner*—David Q Nguyen
(74) *Attorney, Agent, or Firm*—Lowe Hauptman Ham & Berner LLP

(57) ABSTRACT

The present invention relates to a handover method for a dual band/dual mode mobile communication terminal between a synchronous mobile communication network and an asynchronous mobile communication network. The method includes the first step of the main processor setting an initial mobile communication network connection to the asynchronous mobile communication network and connecting to the asynchronous mobile communication network when power is applied; the second step of activating the synchronous RF device and setting up a connection to the synchronous mobile communication network when the intensity of a signal from the asynchronous mobile communication network is equal to or lower than a first predetermined reference value; the third step of determining whether the intensity of a signal from the asynchronous mobile communication network is equal to or lower than a second predetermined reference value previously set for the handover; the fourth step of activating the connection to the synchronous mobile communication network set up at the second step if the intensity of the signal from the asynchronous mobile communication network is determined to be equal to or lower than the second predetermined reference value at the third step; and the fifth step of releasing the connection to the asynchronous mobile communication network.

13 Claims, 9 Drawing Sheets

HAND OVER METHOD FOR DUAL BAND/DUAL MODE MOBILE COMMUNICATION TERMINAL

CROSS REFERENCE TO RELATED APPLICATION

This application is the National Phase application of International Application No. PCT/KR2005/001118, filed Apr. 19, 2005, which designates the United States and was published in English. This application, in its entirety, is incorporated herein by reference.

TECHNICAL FIELD

The present invention relates, in general, to a handover method for a dual band/dual mode mobile communication terminal and, more particularly, to a handover method for a dual band/dual mode mobile communication terminal, which completes the setup of a connection between a synchronous modem unit and a synchronous mobile communication network while maintaining a connection to an asynchronous communication network and then terminates the connection to the asynchronous communication network, thereby enabling roaming between the synchronous mobile communication network and the asynchronous mobile communication network without hindrance and overcoming a disconnection problem occurring at the time of handover of a mobile communication terminal during communication.

BACKGROUND ART

Currently, mobile communication service may be classified into asynchronous service, widely adopted in Europe, and synchronous service, widely adopted in North America. Further, as a new standard of mobile communication technology for transmitting packets at high speed, International Mobile Telecommunications (IMT)-2000 service has been developed in North America and Europe.

The synchronous IMT-2000 service has been developed into Code Division Multiple Access (CDMA) 2000 1x and CDMA2000 1x Evolution Data Only (EV-DO), and the asynchronous IMT-2000 service has been developed into Wideband CDMA (WCDMA) Universal Mobile Telecommunications System (UMTS) service. In this service environment, a dual band/dual mode terminal (DB/DM mobile communication terminal) capable of being used both in a synchronous mobile communication system and in an asynchronous mobile communication system has been developed so as to support global roaming between a synchronous mobile communication network and an asynchronous mobile communication network. With such a mobile communication terminal, different services can be used in the respective areas of an asynchronous system and a synchronous system.

Currently, the asynchronous mobile communication network is being constructed for regions having great demand for service and, therefore, the synchronous mobile communication network is evolving such that the service area thereof includes the service areas of asynchronous systems. In this environment, handover between the systems is required to provide continuous service in the case where a user moves between the asynchronous mobile communication network and the synchronous mobile communication network.

Currently, at the time of handover between an asynchronous mobile communication network and a synchronous mobile communication network, the handover is performed in such a way as to stop communication with a connected mobile communication network and then connect to another mobile communication network. In this case, there is a disadvantage in that a long handover time is required, so that a call disconnection occurs for an excessive time, thereby degrading service quality.

DISCLOSURE OF THE INVENTION

Accordingly, the present invention has been made keeping in mind the above problems, and an object of the present invention is to provide a handover method for a dual band/dual mode mobile communication terminal, which enables roaming between the synchronous mobile communication network and the asynchronous mobile communication network without hindrance and solving a disconnection problem occurring at the time of handover of a mobile communication terminal during communication.

BEST MODE FOR CARRYING OUT THE INVENTION

Figure 1:
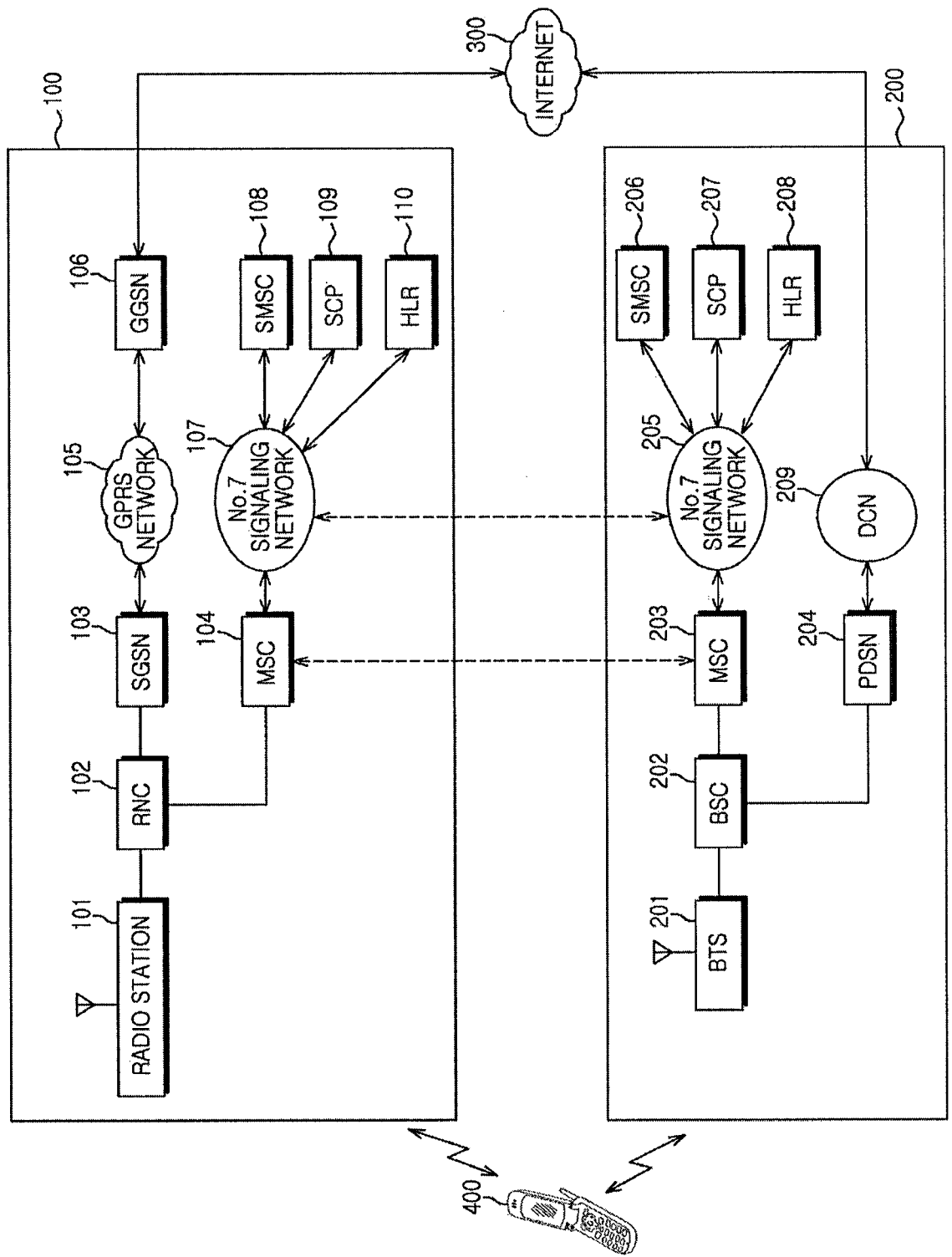
FIG. 1 is a block diagram illustrating the connection between a mobile communication terminal and mobile communication networks according to the present invention.

In order to accomplish the above object the present invention provides a handover method for a dual band/dual mode mobile communication terminal, the mobile communication terminal including an antenna for transmitting and receiving radio waves to/from an asynchronous mobile communication network and a synchronous mobile communication network, an asynchronous RF device for performing asynchronous communication with the asynchronous mobile communication network via the antenna, a synchronous RF device for performing synchronous communication with the synchronous mobile communication network via the antenna, a main processor for controlling wireless communication with the synchronous and asynchronous mobile communication networks via the synchronous and asynchronous Radio Frequency (RF) devices, and a common module for providing common resources, and being capable of performing wireless communication with the asynchronous mobile communication network and the synchronous mobile communication network, the method including the first step of the main processor setting an initial mobile communication network connection to the asynchronous mobile communication network and connecting to the asynchronous mobile communication network at the time of power application; the second step of activating the synchronous RF device and setting up a connection to the synchronous mobile communication network when the intensity of a signal from the asynchronous mobile communication network is equal to or lower than a first predetermined reference value; the third step of determining whether the intensity of a signal from the asynchronous mobile communication network is equal to or lower than a second predetermined reference value previously set for the handover; the fourth step of activating the connection to the synchronous mobile communication network set up at the second step if the intensity of the signal from the asynchronous mobile communication network is determined to be equal to or lower than the second predetermined reference value at the third step; and the fifth step of releasing the connection to the asynchronous mobile communication network.

Additionally, the present invention provides a handover method for a dual band/dual mode mobile communication terminal in a mobile communication network in which an asynchronous mobile communication network and a synchronous mobile communication network coexist, the mobile communication terminal having an asynchronous modem unit and a synchronous modem unit, the method including the step of the asynchronous mobile communication network requesting connection switching to the synchronous mobile communication network as the mobile terminal, which connected to and performing call with the asynchronous mobile communication network, moves toward the synchronous mobile communication network and, accordingly, a handover event occurs; the step of an MSC of the synchronous mobile communication network requesting handover from a BTS of the synchronous mobile communication network; the step of the BTS assigning a forward channel to the synchronous modem unit of the mobile communication terminal; the step of the MSC of the synchronous mobile communication network transmitting a response signal for the connection switching request to the asynchronous mobile communication network; the step of the asynchronous mobile communication network transmitting a handover instruction message, including channel assignment information, to the asynchronous modem unit of the mobile communication terminal; the step of the asynchronous modem unit of the mobile communication terminal transmitting the channel assignment information to the synchronous modem unit; the step of the synchronous modem unit performing a process of preparing for communication, thereby achieving mode switching between the asynchronous modem unit and the synchronous modem unit; the step of reverse channel assignment being achieved between the synchronous modem unit and the synchronous mobile communication network and the connection being completed; and the step of the synchronous mobile communication network requesting the asynchronous mobile communication network to release a call with the asynchronous modem unit.

Embodiments of the present invention will be described below in detail with reference to the attached drawings.

Various modifications may be made to the exemplary embodiments without departing from the spirit and scope of the present invention, which is limited only by the appended claims.

FIG. 1 is a block diagram illustrating the construction of synchronous and asynchronous mobile communication networks according to the present invention.

Referring to FIG. 1, a WCDMA network 100, which is an asynchronous network, includes a radio station 101 for wirelessly communicating with a mobile communication terminal 400, a Radio Network Controller (hereinafter referred to as an "RNC") 102 for controlling the radio station 101, a Serving General Packet Radio Service (GPRS) Service Node (hereinafter referred to as an "SGSN") 103 connected to the RNC 102 to manage the mobility of the mobile communication terminal 400, and a Gateway GPRS Supporting Node (hereinafter referred to as a "GGSN") 106, that is, a relay device for controlling a packet service and transferring packet data via a GPRS network 105.

Furthermore, a Mobile Switching Center (hereinafter referred to as an "MSC") 104 for performing call switching is connected to the RNC 102, and the MSC 104 is connected to a No. 7 signaling network 107 for performing signal switching. The No. 7 signaling network 107 is connected to a Short Message Service Center (hereinafter referred to as an "SMSC") 108 for providing short message services, and a Home Location Register (hereinafter referred to as an "HLR") 110 for managing information about the locations of subscribers.

Meanwhile, a CDMA2000 network 200, which is a synchronous network, includes a Base Transceiver Station (hereinafter referred to as a "BTS") 201 for wirelessly communicating with the mobile communication terminal 400, a Base Station Controller (hereinafter referred to as a "BSC") 202 for controlling the BTS 201, a Packet Data Service Node (hereinafter referred to as a "PDSN") 204 connected to the BSC 202 to provide packet data service, a Data Core Network (hereinafter referred to as a "DCN") 209 connected to the PDSN 204 to provide Internet access service, and an MSC 203 connected to the BSC 202 to perform call switching.

The MSC 203 is connected to a No. 7 signaling network 205 for performing signal switching. The No. 7 signaling network 205 is connected to an SMSC 206 for providing short message services, and an HLR 208 for managing information about the locations of subscribers.

Although, in this embodiment, the synchronous network 200 and the asynchronous network 100 are respectively provided with the HLR 110 and HLR 208 for managing subscriber information and location information, the synchronous network 200 and the asynchronous network 100 may share subscriber information and location information using a single HLR (a dual stack HLR).

In the above-described mobile communication network, the mobile communication terminal 400 of the present invention is connected between the asynchronous network 100 and the synchronous network 200, and transmits and handles the signal processing status of the two systems.

Figure 2:
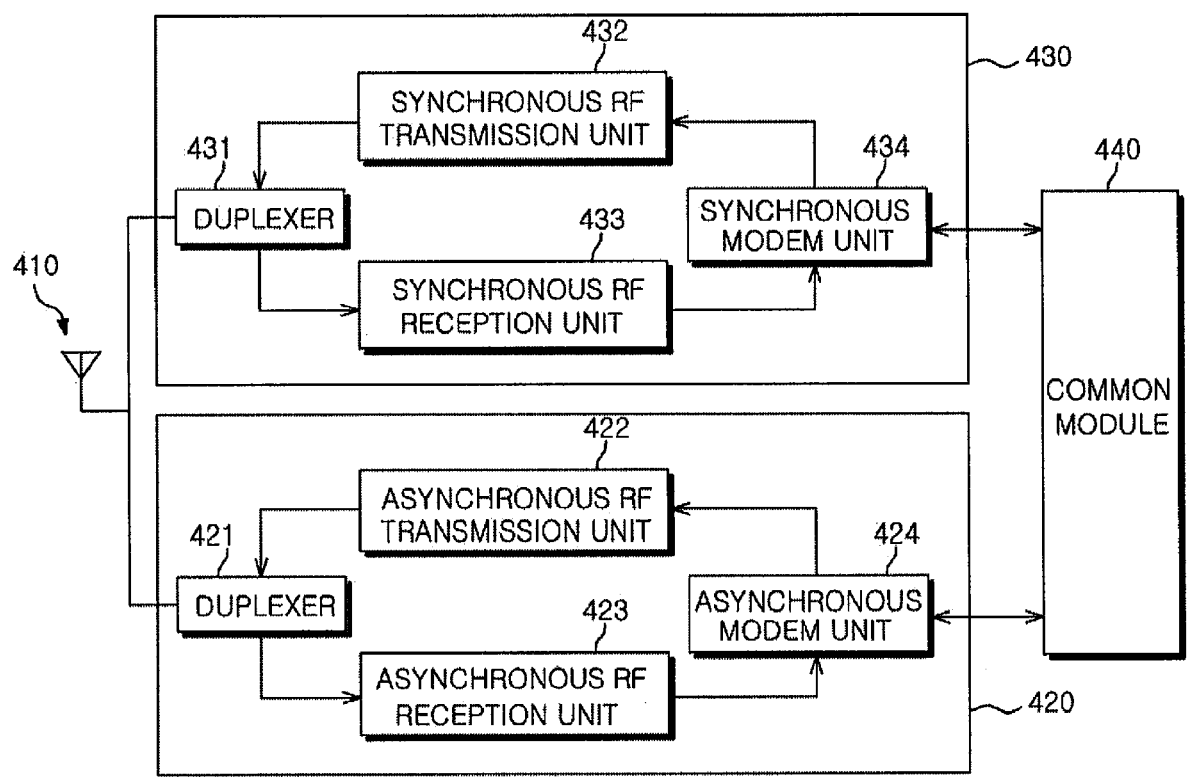
FIG. 2 is a block diagram illustrating the construction of a mobile communication terminal according to the present invention.

FIG. 2 is a block diagram illustrating the construction of a dual band/dual mode mobile communication terminal according to the present invention.

Referring to FIG. 2, the dual band/dual mode mobile communication terminal 400 according to the present invention is provided with separate protocol stacks so as to support both synchronous mobile communication and asynchronous mobile communication.

The mobile communication terminal 400 according to the present invention includes an antenna 410 for transmitting and receiving radio waves with respect to the synchronous mobile communication network 200 and the asynchronous mobile communication network 100, a synchronous Radio Frequency (RF) device 430 for performing synchronous communication, an asynchronous RF device 420 for performing asynchronous communication, and a common module 440 for providing common resources at the time of synchronous and asynchronous communication.

The synchronous RF device 430 includes synchronous RF transmission and reception units 432 and 433 for dividing transmitted and received radio waves into predetermined frequency bands, and a synchronous modem unit 434 for handling Wireless Section Protocol in connection with the synchronous mobile communication network. The synchronous RF transmission unit 432 and the synchronous RF reception unit 433 are connected to the antenna 410 via a duplexer 431, which acts as a band-pass filter that classifies and processes frequencies, and are connected to the synchronous modem unit 434.

Furthermore, the asynchronous RF device 420 includes asynchronous RF transmission and reception units 422 and 423, also for dividing transmission and reception radio waves into predetermined frequency bands, and an asynchronous modem unit 424 for handling Wireless Section Protocol in connection with the asynchronous mobile communication network. The asynchronous RF transmission unit 422 and the asynchronous RF reception unit 423 are connected to the antenna 410 via a duplexer 421, which acts as a band-pass filter that classifies and processes frequencies, and are connected to the asynchronous modem unit 424.

In the above-described case, the antenna 410 can process both a frequency band for synchronous communication service and a frequency band for asynchronous communication service. Furthermore, the common module 440 operates as a central processing unit for controlling the synchronous modem unit 434 and the asynchronous modem unit 424, and includes an application processor for performing multimedia functions, memory, input/output units, and other application processing units.

The mobile communication terminal 400 of the present invention is provided with software that handles user interfacing, additional service, mobility management, connection/session control, resource control, and protocol processing, so that it allows a user to use various application services, perform handover, and perform protocol conversion appropriate to the mobile communication network.

Figure 3:
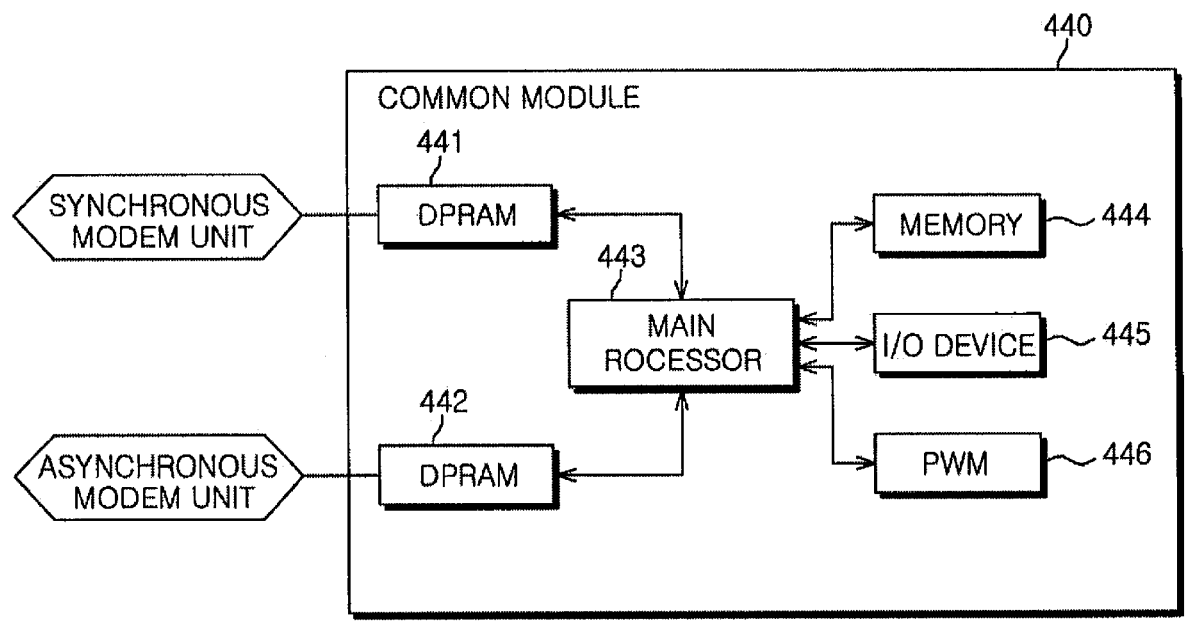
FIG. 3 is a block diagram illustrating the construction of the common module of the mobile communication terminal according to the present invention.

FIG. 3 is a block diagram illustrating the construction of the common module of the mobile communication terminal according to the present invention.

Referring to FIG. 3, the common module 440 of the mobile communication terminal according to the present invention includes a plurality of dual port Random Access Memory (RAM) devices (hereinafter referred to as "DPRAMs") 441 and 442 respectively connected to the modem units 434 and 424 of the synchronous and asynchronous RF devices 430 and 420, and a main processor 443 connected to the DPRAMs 441 and 442 and configured to perform the overall control of the synchronous and asynchronous communication of the mobile communication terminal 400 and execute applications. The main processor 443 is connected to memory 444 for storing data, an I/O device 445 for connecting with peripheral devices, and a power control module (hereinafter referred to as a "PWM") 446 for controlling power.

Figure 4:
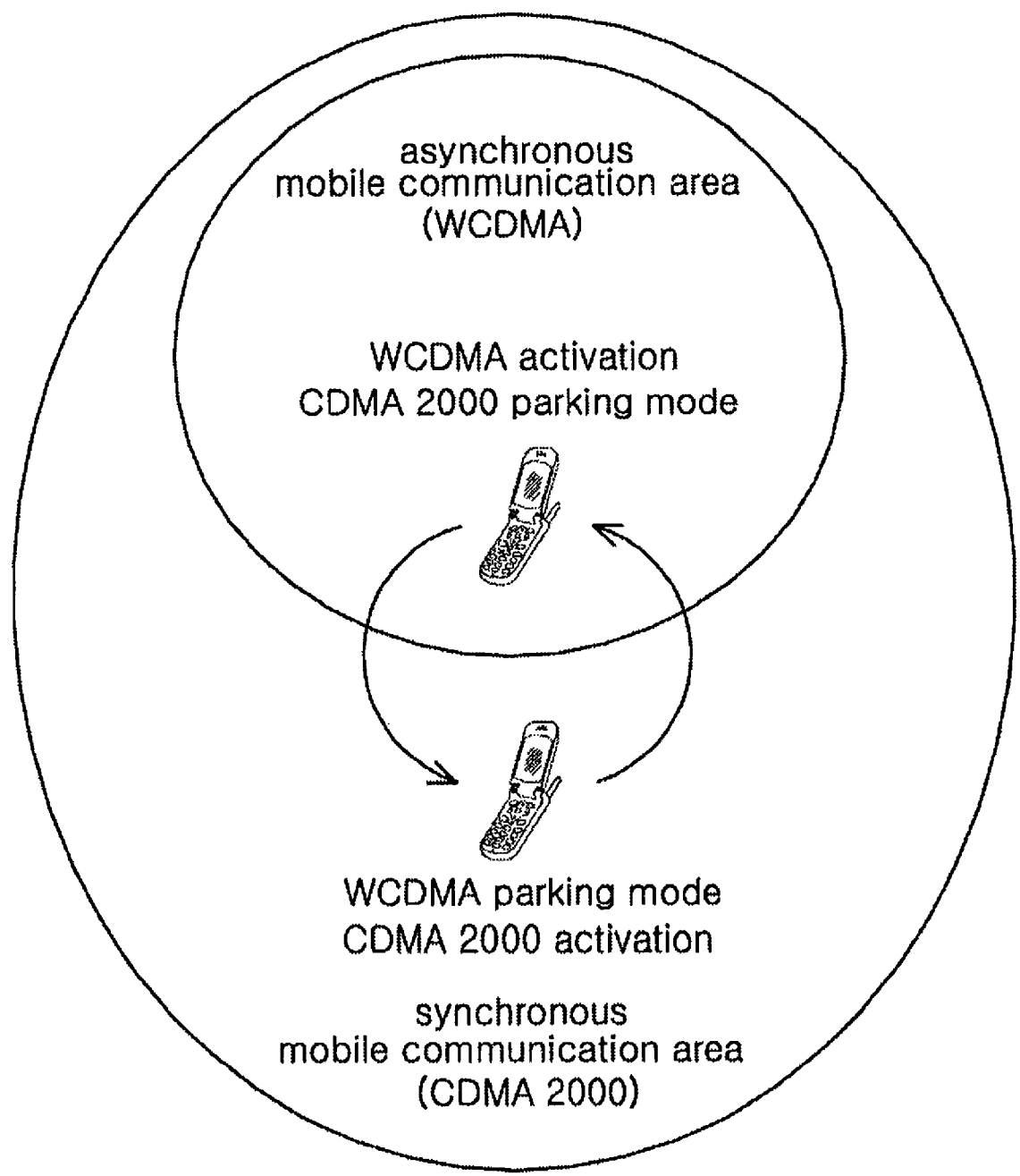
FIG. 4 is a diagram illustrating the handover of a mobile communication terminal depending on the areas of asynchronous and synchronous communication networks according to the present invention.

FIG. 4 is a diagram illustrating the handover of a mobile communication terminal depending on the areas of asynchronous and synchronous communication networks according to an embodiment of the present invention.

In a mobile communication network, handover (or handoff) refers to a technology for enabling a user to communicate without disconnection as a mobile communication terminal moves from one cell of a mobile communication network to another cell.

Referring to FIG. 4, the present invention provides a handover method for a DB/DM mobile communication 400 in a network in which an asynchronous mobile communication network 100 and a synchronous mobile communication network 200 coexist. In the present embodiment, the area of the asynchronous mobile communication network 100 is included in the area of the synchronous mobile communication network 200.

In the present invention, in the area of the asynchronous mobile communication network 100, the synchronous RF device (CDMA2000) 430 is set to a parking mode and the asynchronous RF device (WCDMA) 420 is set to an active state. In the area of the synchronous mobile communication network 200, the asynchronous RF device (WCDMA) 420 is set to a parking mode and the synchronous RF device (CDMA2000) 430 is set to an active state.

Figure 5:
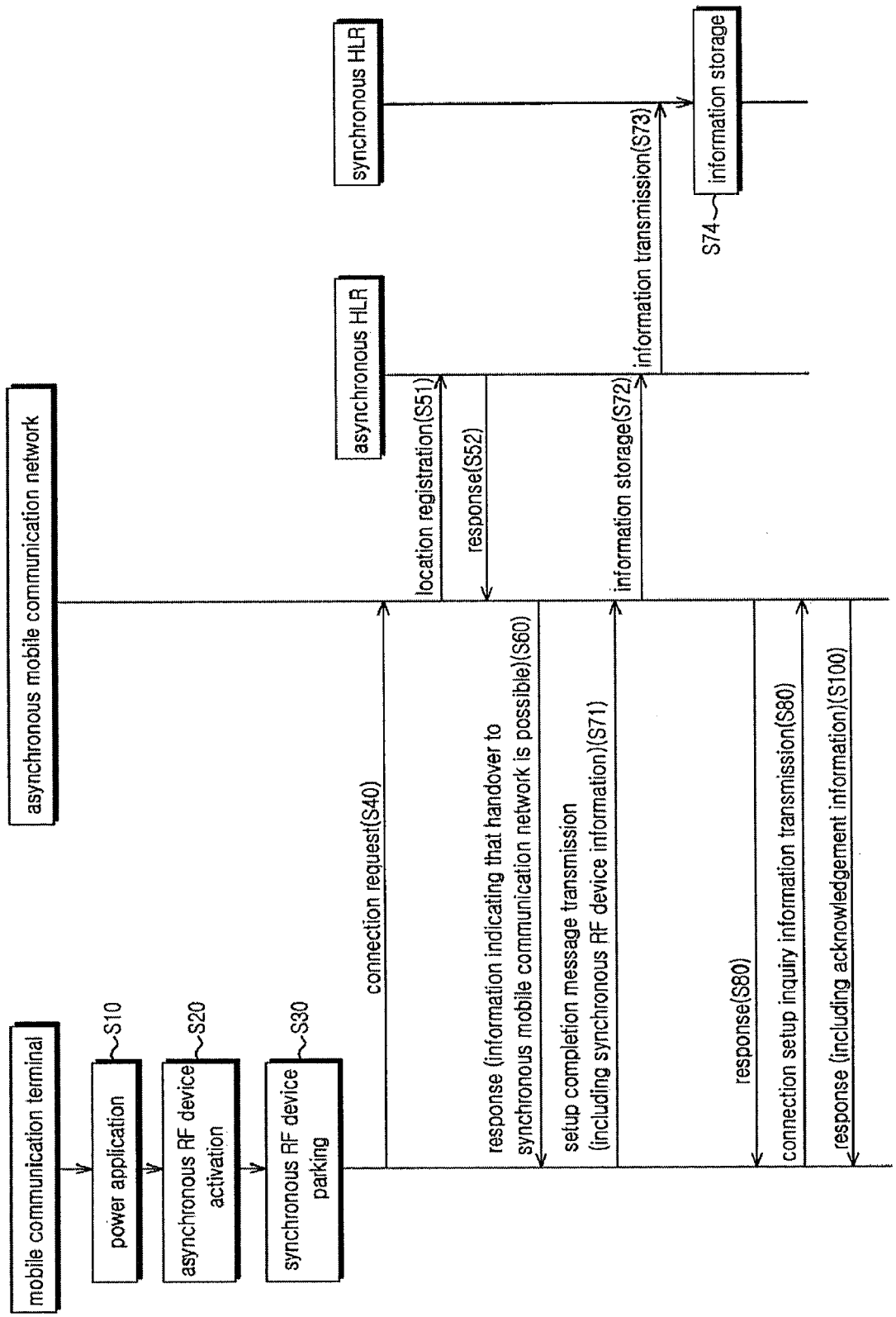
FIG. 5 is a flowchart illustrating a process of connecting based on the initial operation of the mobile communication terminal according to an embodiment of the present invention.

FIG. 5 is a flowchart illustrating a process of connecting based on the initial operation of the mobile communication terminal according to an embodiment of the present invention.

Referring to FIG. 5, in the mobile communication terminal according to the present invention, when initial power is applied at step S10, the main processor 443 first selects asynchronous communication. For this purpose, the main processor 443 activates the asynchronous RF device 420 at step S20, and sets the synchronous RF device 430 to a parking mode at step S30.

After setting the asynchronous RF device 420 to an active state and parking the synchronous RF device 430 at steps S20 and S30, the main processor 443 requests a connection from the asynchronous mobile communication network 100 at step S40.

The asynchronous mobile communication network 100 requests location registration from the asynchronous HLR 110 in response to the connection request of step S40 at step S51, and the asynchronous HLR 110 transmits a response based on location registration at step S52.

The asynchronous mobile communication network 100 transmits a response message based on the connection request to the mobile communication terminal 400 at step S60. In this case, the response message includes information indicating that handover from the current asynchronous mobile communication network 100 to the synchronous mobile communication network 200 is possible.

The main processor 443 of the mobile communication terminal 400 receives the response of step S60 via the asynchronous RF device 420, and then traits a message indicating the completion of the setup of the connection to the asynchronous mobile communication network 100 at step S71. In this case, the message includes information about the synchronous RF device 430 through which the mobile communication terminal can connect to the synchronous mobile communication network 200.

After receiving the message of step S71, the asynchronous mobile communication network 100 stores information about the synchronous RF device 430 of the mobile communication terminal 400 in the asynchronous HLR 110 at step S72. At this time, the asynchronous HLR 110 transmits the information of the step S72 to the HLR 208 of the synchronous mobile communication network 200 at step S73, and the synchronous HLR 208 stores the information from the asynchronous HLR 110 at step S74, thereby providing for handover.

The asynchronous mobile communication network 100 transmits the response message of step S71 to the mobile communication terminal 400 at step S80.

Consequently, the setup of the connection between the mobile communication terminal 400 and the asynchronous mobile communication network 100 is completed. In order to inquire about the connection setup, the mobile communication terminal 400 transmits a message including information inquiring about the setup of the current connection to the asynchronous mobile communication network 100 at step S90.

Accordingly, the asynchronous mobile communication network 100 transmits an acknowledgement message to the inquiry about the connection setup to the mobile communication terminal 400 at step S100, thereby completing the entire connection setup.

Figure 6:
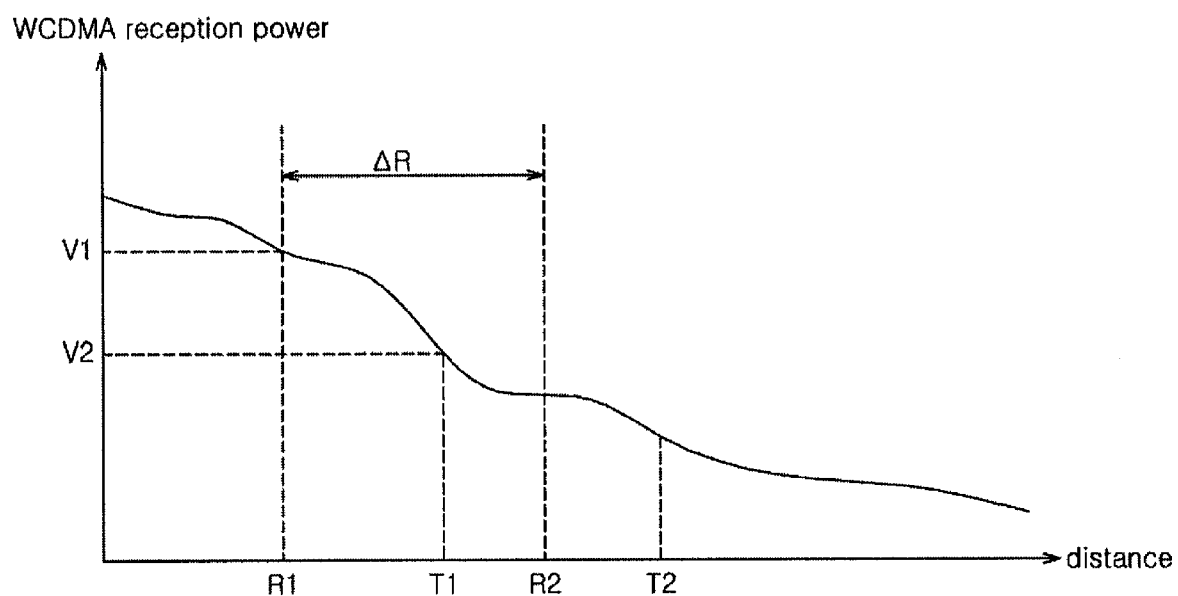
FIG. 6 is a schematic graph illustrating the handover of a mobile communication terminal from an asynchronous communication network to a synchronous communication network according to an embodiment of the present invention.

FIG. 6 is a schematic graph illustrating the handover of the mobile communication terminal from the asynchronous communication network to the synchronous communication network according to the present invention.

FIG. 6 illustrates a process in which the mobile communication terminal 400 connects to the asynchronous mobile communication network 100, moves out of the area of the asynchronous mobile communication network 100, and then enters the area of the synchronous mobile communication network 200. The illustrated ΔR indicates a region in which the area of the asynchronous mobile communication network 100 overlaps the area of the synchronous mobile communication network 200.

When a signal from the synchronous mobile communication network is received in the state in which the level of a signal from the asynchronous mobile communication network has decreased to a first predetermined reference value V1 or less in the region ΔR in which the areas overlap each other, as illustrated in the graph, the mobile communication terminal 400 activates the currently parked synchronous RF device 430. At this time, both the asynchronous and synchronous RF devices 420 and 430 are in an activated state.

When the level of a signal from the asynchronous mobile communication network 100 decreases to a second predetermined reference value V2 or less, which is preset for handover after the activation, control is performed such that the mobile communication terminal 400 performs handover to the synchronous mobile communication network 200 and parks the activated asynchronous RF device 420.

Figure 7:
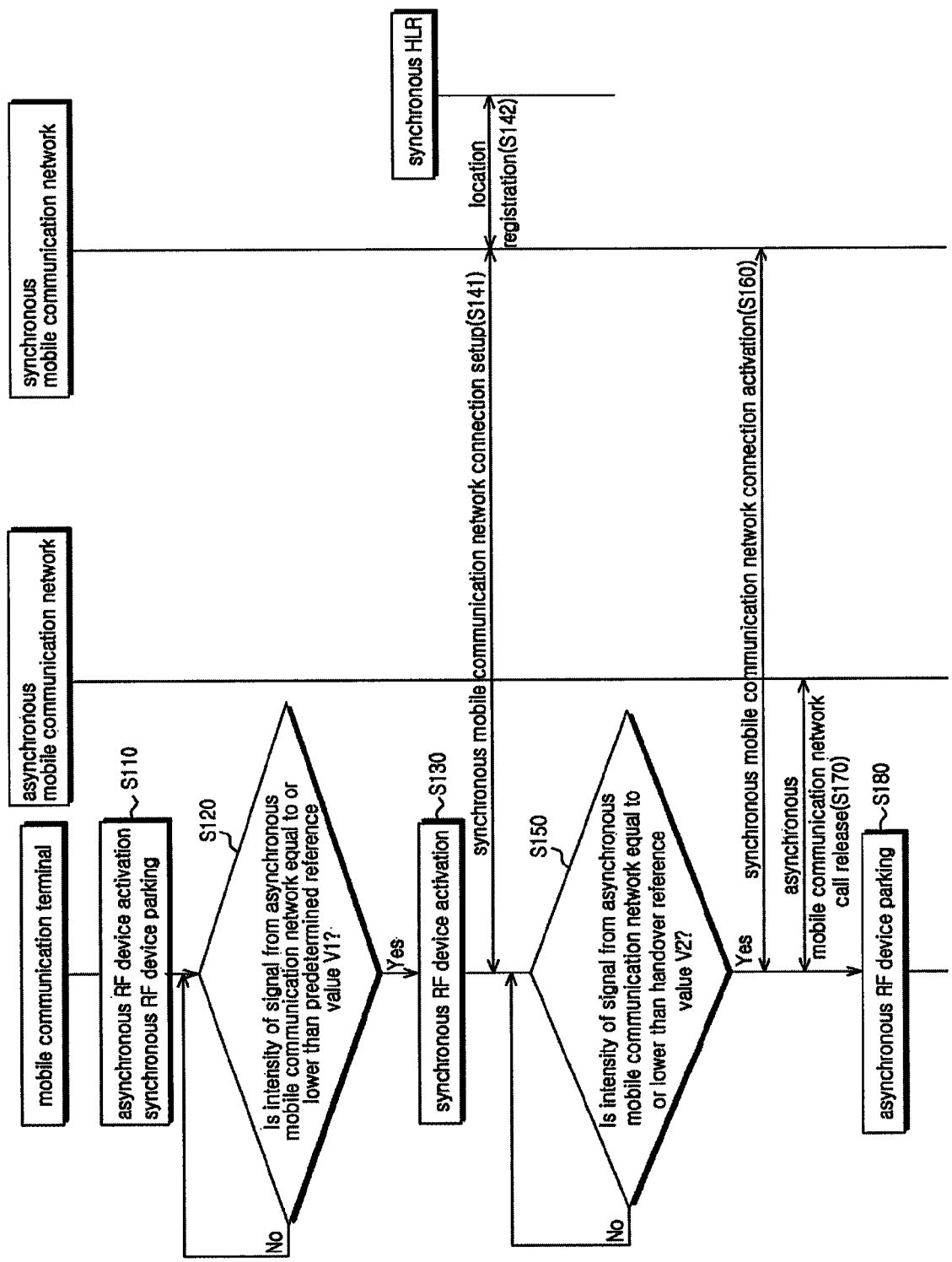
FIG. 7 is a flowchart illustrating the handover procedure of FIG. 6.

FIG. 7 is a flowchart illustrating the handover procedure of FIG. 6.

Referring to FIG. 7, when the mobile communication terminal 400 is located in the area of the asynchronous mobile communication network 100, the main processor 443 activates the asynchronous RF device 420 and sets the synchronous RF device 430 to a parking mode at step S110.

The main processor 443 of the mobile communication terminal 400 determines whether a signal from the asynchronous mobile communication network 100 has decreased to the first predetermined reference value V1 or less at step S120.

If the level of the signal from the asynchronous mobile communication network 100 is determined to have decreased to the first predetermined reference value V1 or less at step S120, it is determined that the mobile communication terminal 400 has moved from the area of the asynchronous mobile communication network 100 to the area of the synchronous mobile communication network 200, and the main processor 443 activates the synchronous RF device 430 placed in a parking mode and performs the setup of a connection to the synchronous mobile communication network 200 at step S141. As a result, the location registration in the synchronous HLR 208 of the synchronous mobile communication network 200 occurs at step S142. At this time, the synchronous HLR 208 refers to information about the handover of the mobile communication terminal 400 based on the information stored at step S74 shown in FIG. 5.

The mobile communication terminal 400 determines whether the level of a signal from the asynchronous mobile communication network 100, which is received through the asynchronous RF device 420, is equal to or lower than a second predetermined reference value V2, which is previously set for handover at step S150.

If the level of the signal from the asynchronous mobile communication network 100 is determined to be equal to or lower than the second predetermined reference value V2 at step S150, the connection to the synchronous mobile communication network 200 set up at step S141 is activated at step S160.

Furthermore, by releasing a current connection to the asynchronous mobile communication network 100 at step S170 and placing the asynchronous RF device 420 in a parking mode at step S180, the handover from the asynchronous mobile communication network 100 to the synchronous mobile communication network 200 is completed.

The asynchronous HLR 110 and the synchronous HLR 208 that have been described in the above process may be implemented using a single HLR, that is, a single dual stack HLR.

Figure 8:
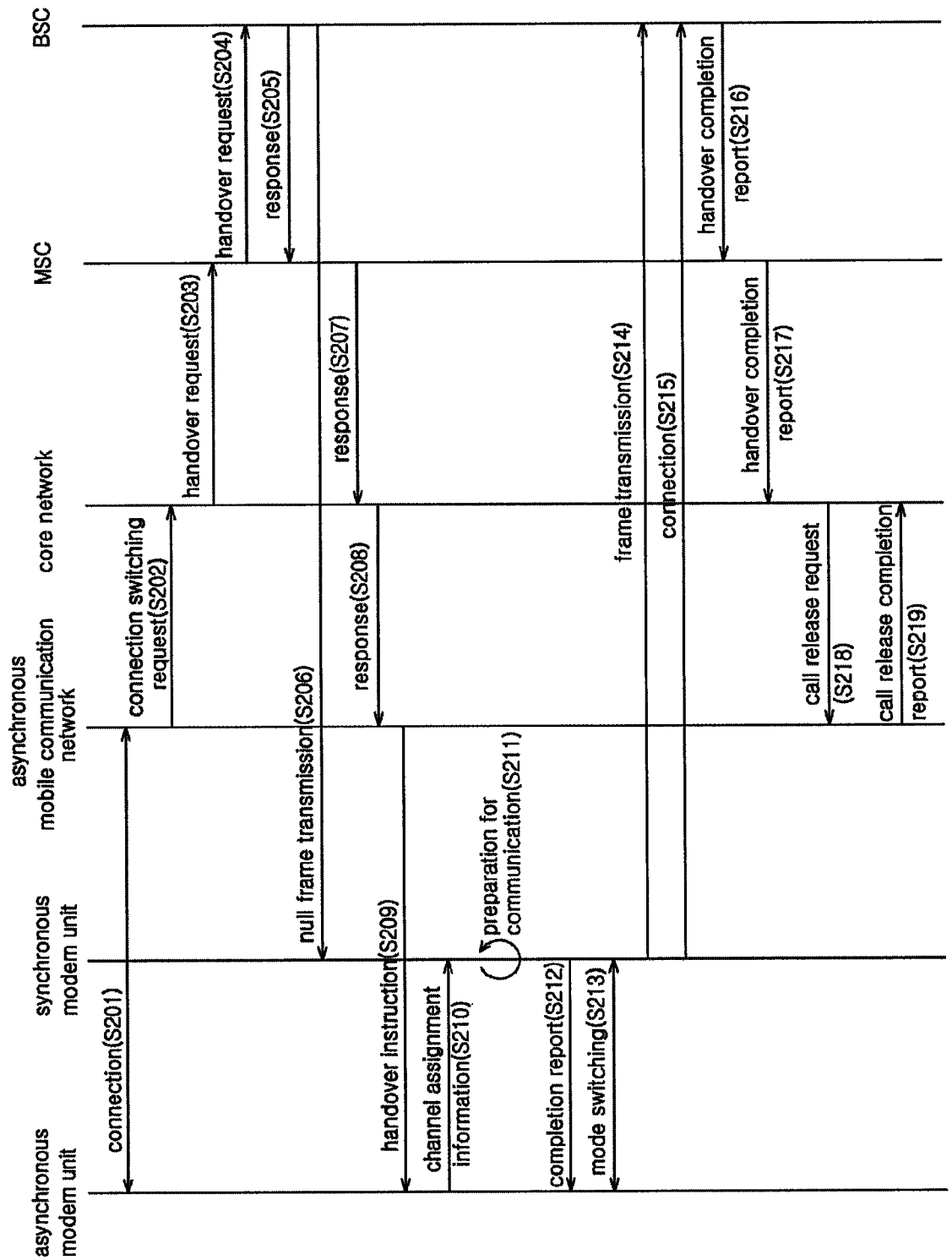
FIG. 8 is a flowchart illustrating a handover method according to another embodiment of the present invention.

FIG. 8 is a flowchart illustrating a handover method according to another embodiment of the present invention, particularly a case of performing handover by switching the synchronous RF device 430 of the mobile communication terminal 400 to a traffic state when the mobile communication terminal 400 moves to a synchronous area in the state of connecting to the asynchronous mobile communication network 100 while performing call.

When the mobile communication terminal 400 moves to the synchronous area and satisfies handover conditions in the state in which the asynchronous module 120 of the mobile communication terminal 400 is activated and the asynchronous modem unit 424 and the asynchronous mobile communication network 100 are connected to each other and perform call at step S201, the asynchronous mobile communication network 100 requests the core network of the synchronous mobile communication network 200 to switch the connection environment of the mobile communication terminal 400 (Relocation Required) at step S202. In this case, the identification number of the mobile communication terminal 400 is transmitted along with the request. The core network requests a handover from the MSC using a Mobile Application Part (MAP) message defined in IS-41 (FACDIR2) at step S203.

Thereafter, the MSC requests handover from the BTS (Handover Request), and the BTS transmits a response signal (Handover Req Ack) to the MSC at steps S204 and S205 and transmits null F-FCH frames to the synchronous modem unit 434 included in the synchronous module 120 of the mobile communication terminal 400 via a Forward Fundamental Channel (F-FCH) for forward traffic transmission, thereby assigning the forward channel. As described above, when the preparation for handover is completed in the synchronous mobile communication network 200, the MSC of the synchronous mobile communication network 200 transmits the response signal facdir2 (Relocation Command) to the connection switching request to the asynchronous mobile communication network 100 via the core network at steps S207 and S208.

Thereafter, the asynchronous mobile communication network 100 instructs the asynchronous modem unit 424 of the mobile communication terminal 400 on the handover (HANDOVER FROM UTRAN COMMAND) at step S209. A message for handover instruction includes a synchronous mobile communication network-related information, particularly, channel assignment information. The channel assignment information is transmitted from the asynchronous modem unit 424 to the synchronous modem unit 434, and allows the synchronous modem unit 434 to prepare for the handover at step S210. Furthermore, at the step S209 at which the asynchronous mobile communication network 100 instructs the asynchronous modem unit 424 on the handover, the handover message (universal handover direction message) of the synchronous mobile communication network 200 is transmitted along with the instruction, thereby causing the handover to be performed.

As described above, as the synchronous modem unit 434 receives the channel assignment message and the handover message, the synchronous RF device 430 performs a process of preparing for communication with the synchronous mobile communication network 200 at step S211. When the process of preparing for communication is completed, notification of this is provided to the asynchronous modem unit 424 (call connected) at step S212.

When the synchronous RF device 430 of the mobile communication terminal 400 completes the preparation for communication with the synchronous mobile communication network 200, mode switching between the asynchronous modem unit 424 and the synchronous modem unit 434 is performed at step S213, and the synchronous modem unit 434 transmits frames (R-FCH frames) to the BTS of the synchronous mobile communication network 200 via a Reverse Fundamental Channel (R-FCH) at step S214. Accordingly, the connection between the mobile communication terminal 400 and the synchronous mobile communication network 200 is set up at step S215.

Thereafter, the BTS provides notification of the completion of the handover (Handover Complete, MSONCH) to the core network via the MSC at steps S216 and S217, and the core network requests the asynchronous mobile communication network 100 to release a call with the asynchronous modem unit 424 (Iu Release Command) at step S218. Accordingly, the asynchronous mobile communication network 100 terminates the connection to the asynchronous modem unit 424 and reports the completion of the call release (IU Rel. Complete) to the core network at step S219, thereby completing the handover from the asynchronous mobile communication network 100 to the synchronous mobile communication network 200.

Figure 9:
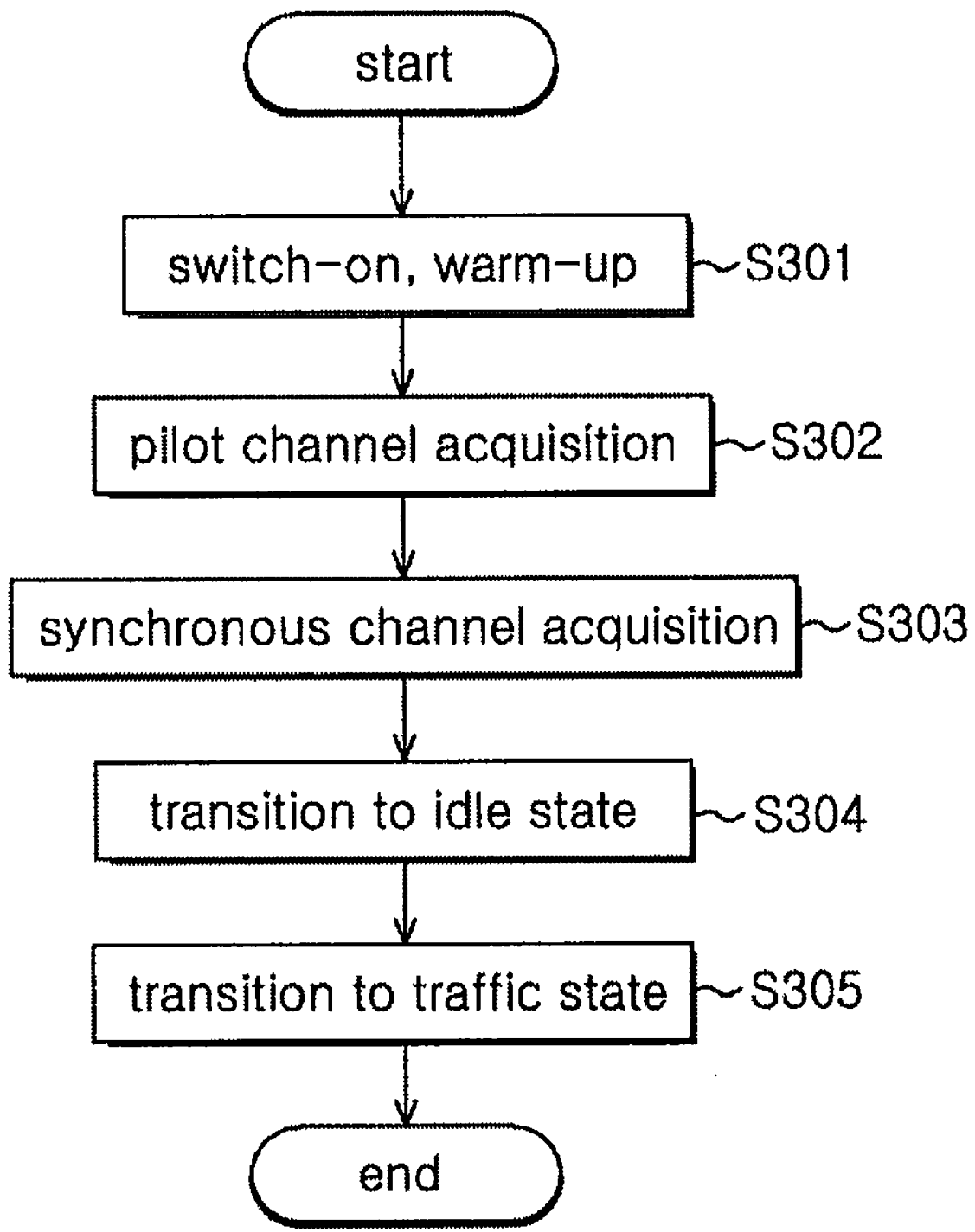
FIG. 9 is a detailed flowchart illustrating a process of preparing for communication in the synchronous modem unit shown in FIG. 8.

FIG. 9 is a detailed flowchart illustrating a process of preparing for communication in the synchronous modem unit shown in FIG. 8.

The synchronous modem unit 434 that received the channel assignment information from the asynchronous modem unit 424 is activated via switch-on and warm-up processes at step S301, and acquires a pilot channel and a synchronous channel at steps S302 and S303. By acquiring the pilot channel, the BTS of the synchronous mobile communication network 200 and the terminal 400 are synchronized with each other, and by acquiring the synchronous channel, timing information and other system information can be received from the BTS.

As a result, the synchronous RF device 430 of the mobile communication terminal 400 makes the transition to a traffic state from an idle state at steps S304 and S305, thus connecting to the synchronous mobile communication network 200.

INDUSTRIAL APPLICABILITY

As described above, according to the handover method for a dual band/dual mode mobile communication terminal according to the present invention, the dual band/dual mode mobile communication terminal initially connects to an asynchronous mobile communication network in a mobile communication environment in which an asynchronous mobile communication network and a synchronous mobile communication network coexist at the time of initial power application, the handover between the asynchronous mobile communication network and the synchronous mobile communication network can be performed without hindrance, and a disconnection problem can be prevented at the time of handover by completing a connection to a target mobile communication network while maintaining a connection to a previously connected mobile communication network at the time of handover of the dual band/dual mode mobile communication terminal, and then terminating the connection to the previously connected mobile communication network, thereby improving service quality.

The invention claimed is:

1. A handover method for a dual band/dual mode mobile communication terminal including an asynchronous Radio Frequency (RF) device for performing asynchronous communication and a synchronous RF device for performing synchronous communication and being capable of performing wireless communication with a asynchronous mobile communication network and a synchronous mobile communication network, comprising:

the first step of setting an initial mobile communication network connection to the asynchronous mobile communication network and connecting to the asynchronous mobile communication network when power is applied;

the second step of activating the synchronous RF device and setting up a connection to the synchronous mobile communication network when the intensity of a signal from the asynchronous mobile communication network is equal to or lower than a first predetermined reference value;

the third step of determining whether the intensity of a signal from the asynchronous mobile communication network is equal to or lower than a second predetermined reference value previously set for the handover;

the fourth step of activating the connection to the synchronous mobile communication network set up at the second step if the intensity of the signal from the asynchronous mobile communication network is determined to be equal to or lower than the second predetermined reference value at the third step; and the fifth step of releasing the connection to the asynchronous mobile communication network, wherein the first step comprises:

an asynchronous activation step of activating the asynchronous RF device when power is applied;

a connection request step of requesting a connection to the asynchronous mobile communication network via the asynchronous RF device;

a connection performance step of the asynchronous mobile communication network making location registration based on the connection request with a Home Location Register (HLR) of the asynchronous mobile communication network and transmitting a response message to the location registration to the mobile communication terminal; and a connection completion step of the mobile communication terminal receiving the response at the connection performance step, transmitting a connection setup completion message to the mobile communication network, and receiving a response.

2. The method as set forth in claim 1, wherein the response message of the connection performance step includes information indicating that handover to the synchronous mobile communication network is possible.

3. The method as set forth in claim 2, wherein the connection setup completion message of the connection completion step includes information about the synchronous RF device based on the information indicating that the handover to the synchronous mobile communication network is possible.

4. The method as set forth in claim 3, wherein the connection completion step comprises:

the step of storing the information about the synchronous RF device included in the connection setup completion message in the HLR of the asynchronous mobile communication network, and the step of the HLR of the asynchronous mobile communication network transferring and registering the information about the synchronous RF device to and with an HLR of the synchronous network.

5. The method as set forth in claim 1, wherein the first step comprises:

the step of the mobile communication terminal transmitting information inquiring about the currently completed connection setup to the asynchronous mobile communication network after the connection completion step, and the step of the asynchronous mobile communication network receiving the information inquiring about connection setup and transmitting an acknowledgement message to the mobile communication terminal.

6. The method as set forth in claim 1, wherein the second step comprises:

the step of activating the synchronous RF device, the step of setting up the connection to the synchronous mobile communication network via the synchronous RF device, and the step of performing registration of a location of the mobile communication terminal with an HLR of the synchronous mobile communication network.

7. The method as set forth in claim 1, wherein the fifth step comprises the step of setting the asynchronous RF device in a parking mode after releasing the connection to the asynchronous mobile communication network.

8. A handover method for a dual band/dual mode mobile communication terminal in a mobile communication network in which an asynchronous mobile communication network and a synchronous mobile communication network coexist, the mobile communication terminal having an asynchronous modem unit and a synchronous modem unit, the method comprising:

the step of the asynchronous mobile communication network requesting connection switching to the synchronous mobile communication network as the mobile communication terminal, which connected to and performing call with the asynchronous mobile communication network, moves toward the synchronous mobile communication network and, accordingly, a handover event occurs;

the step of a Mobile Switching Center (MSC) of the synchronous mobile communication network requesting handover by transmitting handover message to a Base Transceiver Station (BTS) of the synchronous mobile communication network;

the step of the BTS assigning a forward channel to the synchronous modem unit of the mobile communication terminal;

the step of the MSC of the synchronous mobile communication network transmitting a response signal for the connection switching request to the asynchronous mobile communication network;

the step of the asynchronous mobile communication network transmitting a handover instruction message, including channel assignment information, to the asynchronous modem unit of the mobile communication terminal;

the step of the asynchronous modem unit of the mobile communication terminal transmitting the channel assignment information to the synchronous modem unit;

the step of the synchronous modem unit performing a process of preparing for communication, thereby achieving mode switching between the asynchronous modem unit and the synchronous modem unit;

the step of reverse channel assignment being achieved between the synchronous modem unit and the synchronous mobile communication network and the connection being completed; and the step of the synchronous mobile communication network requesting the asynchronous mobile communication network to release a call with the asynchronous modem unit.

9. The method as set forth in claim 8, wherein the asynchronous mobile communication network transmits an identification number of the mobile communication terminal at the step of the asynchronous mobile communication network requesting the connection switching to the synchronous mobile communication network.

10. The method as set forth in claim 8, wherein the handover instruction message includes a handover message of the synchronous mobile communication network.

11. The method as set forth in claim 8, wherein the process of preparing for communication comprises:

the step of performing switch-on and warm-up processes of the synchronous modem unit;

the step of acquiring a pilot channel and a synchronous channel from the synchronous mobile communication network;

the step of the synchronous modem unit making a transition to an idle state; and the step of the synchronous modem unit, placed in an idle state, making transition to a traffic state.

12. The method as set forth in claim 8, further comprising:

the step of the mobile communication terminal performing location registration with the asynchronous mobile communication network before connecting to and performing call with the asynchronous mobile communication network; and the step of the mobile communication terminal transmitting terminal information to the asynchronous mobile communication network after being notified of the fact that the handover to the synchronous mobile communication network is possible by the asynchronous mobile communication network when the location registration is performed.

13. The method of claim 1, wherein the first step is performed by a main processor included in the dual band/dual mode mobile communication terminal and adapted to control wireless communication with the synchronous and asynchronous mobile communication networks via the synchronous and asynchronous RF devices.

* * * * *